United States Patent
Gupta et al.

(10) Patent No.: US 10,219,132 B2
(45) Date of Patent: Feb. 26, 2019

(54) VOICE RAT SELECTION IN MULTI-SIM DEVICES

(71) Applicant: QUALCOMM Incorporated, San Diego, CA (US)

(72) Inventors: Ashutosh Gupta, Hyderabad (IN); Amandeep Singh Bedi, Hyderabad (IN); Rajendra Prasad Katakam, Hyderabad (IN); Ankit Banaudha, Hyderabad (IN); Harinath Reddy Patel, Mahabubnagar (IN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 15/590,518

(22) Filed: May 9, 2017

(65) Prior Publication Data

US 2018/0332428 A1  Nov. 15, 2018

(51) Int. Cl.
*H04W 4/00* (2018.01)
*H04W 4/60* (2018.01)
*H04L 29/12* (2006.01)

(52) U.S. Cl.
CPC .......... *H04W 4/60* (2018.02); *H04L 61/1529* (2013.01); *H04L 61/1564* (2013.01); *H04L 61/2007* (2013.01); *H04L 61/2038* (2013.01); *H04L 61/3095* (2013.01)

(58) Field of Classification Search
CPC ............... H04W 72/04; H04W 72/082; H04W 72/1215; H04W 76/02; H04W 76/025; H04W 88/10; H04W 92/02; H04W 16/14; H04W 28/08; H04W 4/00; H04L 5/0057
See application file for complete search history.

(56) References Cited

U.S. PATENT DOCUMENTS

| | | | |
|---|---|---|---|
| 9,131,429 B1* | 9/2015 | Bharadwaj | H04W 4/90 |
| 2008/0014956 A1* | 1/2008 | Balasubramanian | H04L 41/0806 455/452.1 |
| 2014/0162649 A1 | 6/2014 | Cui et al. | |
| 2015/0163811 A1* | 6/2015 | Konstantinou | H04W 76/16 370/329 |
| 2015/0181530 A1* | 6/2015 | Lee | H04W 52/0261 455/434 |
| 2015/0350983 A1 | 12/2015 | Kwok et al. | |
| 2016/0353449 A1* | 12/2016 | Chuttani | H04W 48/18 |

FOREIGN PATENT DOCUMENTS

| | | |
|---|---|---|
| WO | 2015180129 A1 | 12/2015 |
| WO | 2015180138 A1 | 12/2015 |

* cited by examiner

*Primary Examiner* — Mohamed A Kamara
(74) *Attorney, Agent, or Firm* — Paradice and Li LLP

(57) ABSTRACT

Apparatuses and methods for a wireless communication device having multiple Subscriber Identity Modules (SIMs) in which a first SIM is associated with an Internet Protocol (IP) Multimedia Subsystem (IMS) subscription used for IMS services. The method includes but not limited to, attaching the IMS subscription to a first cell of a packet-switched cellular network, determining a cause of IMS voice service being not currently available at the IMS subscription, determining availability of a wireless local area network (WLAN) connection at the IMS subscription, and providing voice service at the IMS subscription based on the cause of IMS voice service being not currently available and the availability of the WLAN connection at the IMS subscription.

26 Claims, 8 Drawing Sheets

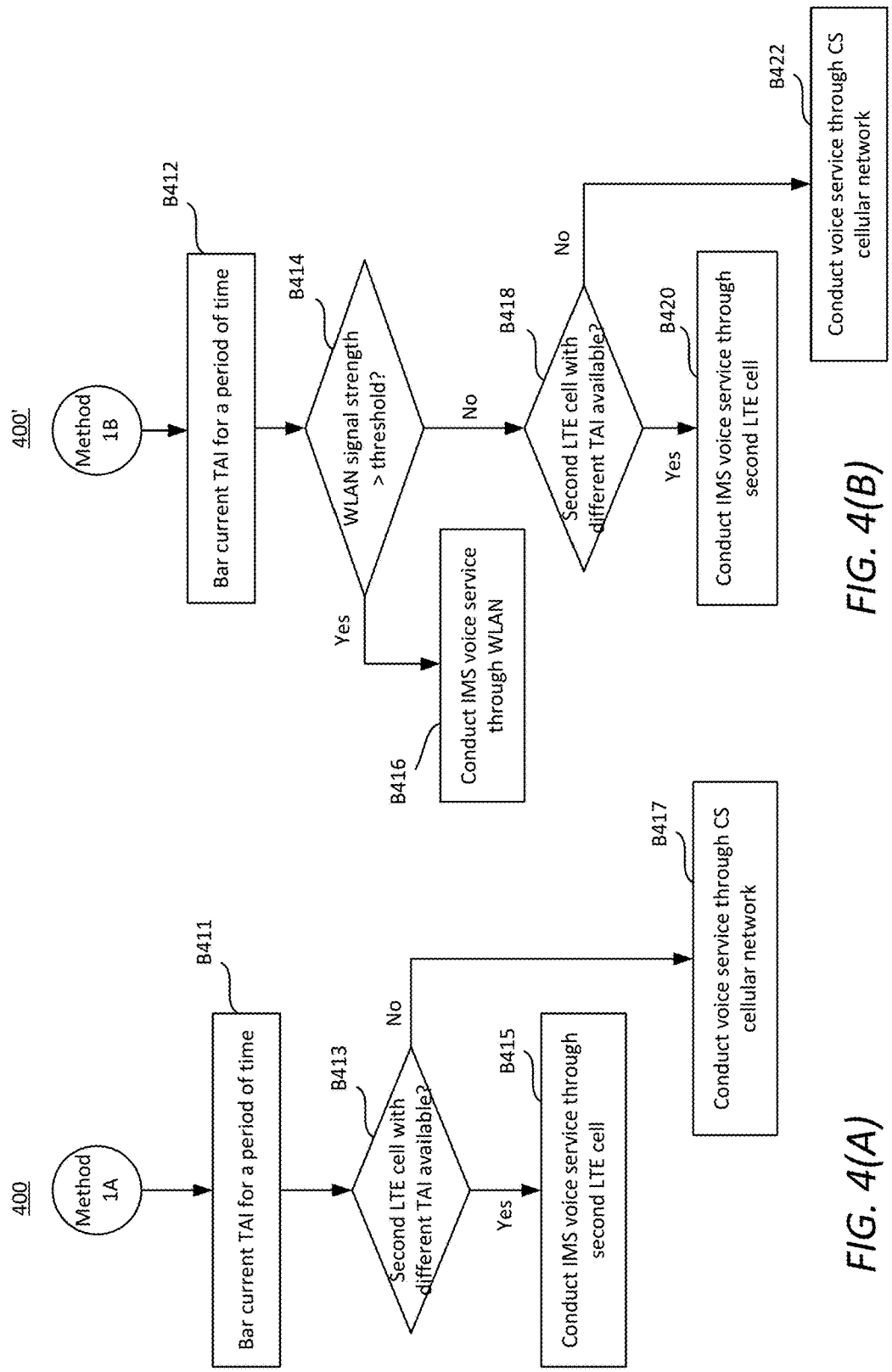

VOICE RAT SELECTION IN MULTI-SIM DEVICES

BACKGROUND

A wireless communication device, such as a mobile phone device or a smart phone, may include two or more Subscriber Identity Modules (SIMs). Each SIM may correspond to at least one subscription via one or more Radio Access Technologies (RATs). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A MSMS (e.g., a Dual-SIM-Dual-Standby (DSDS)) wireless communication device may have multiple subscriptions. In some cases, a first subscription may be utilized for Internet Protocol (IP) Multimedia Subsystem (IMS), providing IMS services such as Voice-Over-LTE (VoLTE), Short Messaging Service (SMS), Rich Communication Service (RCS), etc. A second subscription may be a Designated Data Subscription (DDS) for data services. In this configuration, IMS service may be conducted at the first subscription through packet-switched network (e.g., LTE network). If the IMS voice service is currently unavailable, the wireless communication device may use Circuit-Switch Fall Back (CSFB) to conduct voice service. With CSFB, the LTE network acts as an intermediary between the wireless communication device and a legacy circuit-switched network (e.g., 2G/3G network). When the wireless communication device is to originate a voice call, it sends a Service Request Message (SRM) to the LTE network, which transfers the wireless communication device to the circuit-switched network. When a voice call comes in, the call request first reaches the circuit-switched network, which sends paging messages to the LTE network via Serving Gateways (SGs) interface. The LTE network then forwards the paging messages to the wireless communication device. If the call is accepted, the wireless communication device sends a SRM to the LTE network, which transfers the wireless communication device to the circuit-switched network. When the call is over, the wireless communication device returns to the LTE network. As such, voice calls conducted through CSFB may ensue additional signaling and delay.

SUMMARY

Examples described herein relate to apparatuses and methods for voice RAT selection for a wireless communication device having multiple Subscriber Identity Modules (SIMs) in which a first SIM is associated with an Internet Protocol (IP) Multimedia Subsystem (IMS) subscription used for IMS service. In some examples, the method comprises attaching the IMS subscription to a first cell of a packet-switched cellular network, determining a cause of IMS voice service being not currently available at the IMS subscription, determining availability of a wireless local area network (WLAN) connection at the IMS subscription, and providing voice service at the IMS subscription based on the cause of IMS voice service being not currently available and the availability of the WLAN connection at the IMS subscription.

In some examples, the packet-switched cellular network is a Long Term Evolution (LTE) network.

In some examples, determining the cause of IMS voice service being not currently available comprises determining that Voice over Packet-switched Session (VoPS) is disabled by the first cell, and wherein determining availability of the WLAN connection comprises determining that the WLAN connection is not available at the IMS subscription. The method further comprises barring a Tracking Area Identifier (TAI) associated with the first cell for a period of time, determining whether a second cell of the packet-switched cellular network with a different TAI is available for IMS voice service, and in response to determining that the second cell is available, conducting IMS voice service through the second cell at the IMS subscription.

In some examples, the method further comprises in response to determining that the second cell is not available, conducting voice service through a circuit-switched cellular network.

In some examples, the circuit-switched cellular network is a 2G or 3G network using a Radio Access Technology (RAT) of GSM, UMTS, WCDMA, or 1×.

In some examples, determining the cause of IMS voice service being not currently available comprises determining that Voice over Packet-switched Session (VoPS) is disabled by the first cell, and determining the availability of the WLAN connection comprises determining that the WLAN connection is available at the IMS subscription. The method further comprises barring a TAI associated with the first cell for a period of time, determining whether a signal strength of the WLAN connection is greater than a signal strength threshold, and in response to determining that the signal strength of the WLAN connection is greater than the signal strength threshold, conducting IMS voice service through the WLAN connection.

In some examples, the signal strength threshold is a predetermined value of signal strength.

In some examples, the method further comprises deactivating modem stack at the IMS subscription.

In some examples, the method further comprises in response to determining that the signal strength of the WLAN connection is not greater than the signal strength threshold, determining whether a second cell of the packet-switched cellular network with a different TAI is available for IMS voice service, and in response to determining that the second cell is available, conducting IMS voice service through the second cell at the IMS subscription.

In some examples, the method further comprises in response to determining that the second cell is not available, conducting voice service through a circuit-switched cellular network.

In some examples, determining the cause of IMS voice service being not currently available comprises determining that Voice over Long Term Evolution (VoLTE) is disabled at the wireless communication device by a user, and determining the availability of the WLAN connection comprises determining that the WLAN connection is not available at the IMS subscription. The method further comprises conducting voice service through a circuit-switched cellular network.

In some examples, determining the cause of IMS voice service being not currently available comprises determining that VoLTE is disabled at the wireless communication device by a user, and determining the availability of the WLAN connection comprises determining that the WLAN connection is available at the IMS subscription. The method further comprises determining whether a signal strength of the WLAN connection is greater than a signal strength threshold, and in response to determining that the signal strength of the WLAN connection is greater than the signal strength threshold, conducting IMS voice service through the WLAN connection.

In some examples, the method further comprises in response to determining that the signal strength of the WLAN connection is greater than the signal strength threshold, conducting voice service through a circuit-switched cellular network.

In some examples, determining the cause of IMS voice service being not currently available comprises determining that Service Specific Access Control (SSAC) barring for VoLTE call is enabled at the IMS subscription, and determining the availability of the WLAN connection comprises determining that the WLAN connection is not available at the IMS subscription. The method further comprises determining whether a duration of the SSAC barring is greater than a time threshold, and in response to determining that the duration of the SSAC barring is not greater than the time threshold, conducting IMS voice service using Circuit-Switch Fall Back (CSFB) through the first cell.

In some examples, the method of claim further comprises in response to determining that the duration of the SSAC barring is greater than the time threshold, determining whether a second cell of the packet-switched cellular network is available for IMS voice service, and in response to determining that the second cell is available, conducting IMS voice service through the second cell at the IMS subscription.

In some examples, the method further comprises returning to the first cell in response to that the duration of the SSAC barring expires.

In some examples, the method further comprises in response to determining that the second cell is not available, conducting voice service through a circuit-switched cellular network.

In some examples, the method further comprises returning to the first cell in response to that the duration of the SSAC barring expires.

In some examples, determining the cause of IMS voice service being not currently available comprises determining that that SSAC barring for VoLTE call is enabled at the IMS subscription, and wherein determining the availability of the WLAN connection comprises determining that the WLAN connection is available at the IMS subscription. The method further comprises determining whether a duration of the SSAC barring is greater than a time threshold, and in response to determining that the duration of the SSAC barring is not greater than the time threshold, staying in the first LTE but conducting IMS voice service through the WLAN connection.

In some examples, the method further comprises in response to determining that the duration of the SSAC barring is greater than the time threshold, determining whether a signal strength of the WLAN connection is greater than a signal strength threshold, and in response to determining that the signal strength of the WLAN connection is greater than the signal strength threshold, conducting IMS voice service through the WLAN connection.

In some examples, the method further comprises in response to determining that the signal strength of the WLAN connection is not greater than the signal strength threshold, determining whether a second cell of the packet-switched cellular network is available for IMS voice service, and in response to determining that the second cell is available, conducting IMS voice service through the second cell at the IMS subscription.

In some examples, the method further comprises returning to the first cell in response to that the duration of the SSAC barring expires.

In some examples, the method further comprises in response to determining that the second cell is not available, conducting voice service through a circuit-switched cellular network.

In some examples, the method further comprises returning to the first cell in response to that the duration of the SSAC barring expires.

In some examples, the multiple SIMs further comprise a second SIM, the first SIM is designated for voice only services, and the second SIM is designated for data services.

In some examples, a wireless communication device comprises multiple Subscriber Identity Modules (SIMs) in which a first SIM is associated with an Internet Protocol (IP) Multimedia Subsystem (IMS) subscription used for IMS services. The wireless communication device also comprises a memory, and a processor coupled to the multiple SIMs and the memory. The processor is configured to attach the IMS subscription to a first cell of a packet-switched cellular network, determine a cause of IMS voice service being not currently available at the IMS subscription, determine availability of a wireless local area network (WLAN) connection at the IMS subscription, and provide voice service at the IMS subscription based on the cause of IMS voice service being not currently available and the availability of the WLAN connection at the IMS subscription.

In some examples, determining the cause of IMS voice service being not currently available comprises determining that Voice over Packet-switched Session (VoPS) is disabled by the first cell, and determining the availability of the WLAN connection comprises determining that the WLAN connection is not available at the IMS subscription. The processor is further configured to bar a Tracking Area Identifier (TAI) associated with the first cell for a period of time, determine whether a second cell of the packet-switched cellular network with a different TAI is available for IMS voice service, and in response to determining that the second cell is not available, conduct voice service through a circuit-switched cellular network.

In some examples, determining the cause of IMS voice service being not currently available comprises determining that Voice over Packet-switched Session (VoPS) is disabled by the first cell, and determining the availability of the WLAN connection comprises determining that the WLAN connection is available at the IMS subscription. The processor is further configured to bar a TAI associated with the first cell for a period of time, determine whether a signal strength of the WLAN connection is greater than a signal strength threshold, and in response to determining that the signal strength of the WLAN connection is greater than the signal strength threshold, conduct IMS voice service through the WLAN connection.

In some examples, a non-transitory computer-readable medium having processor-readable instruction such that, when executed, causes a processor to perform a method for a wireless communication device having multiple Subscriber Identity Modules (SIMS) in which a first SIM is associated with an Internet Protocol (IP) Multimedia Subsystem (IMS) subscription used for IMS services. The method comprises attaching the IMS subscription to a first cell of a packet-switched cellular network, determining a cause of IMS voice service being not currently available at the IMS subscription, determining availability of a wireless local area network (WLAN) connection at the IMS subscription, and providing voice service at the IMS subscription based on the cause of IMS voice service being not currently available and the availability of the WLAN connection at the IMS subscription.

In some examples, the packet-switched cellular network is a Long Term Evolution (LTE) network.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

FIG. 4A is a process flowchart diagram illustrating a method of conducting voice service in a situation in which Voice over Packet-switch Session (VoPS) is disabled by a cell to which an IMS subscription of the wireless communication device is currently attached and a Wireless Local Area Network (WLAN) connection is not available at the IMS subscription according to various examples.

FIG. 4B is a process flowchart diagram illustrating a method for conducting voice service in a situation in which VoPS is disabled by a cell to which an IMS subscription and the wireless communication device is currently attached and a WLAN connection is available at the IMS subscription according to various examples.

DETAILED DESCRIPTION

Figure 1:
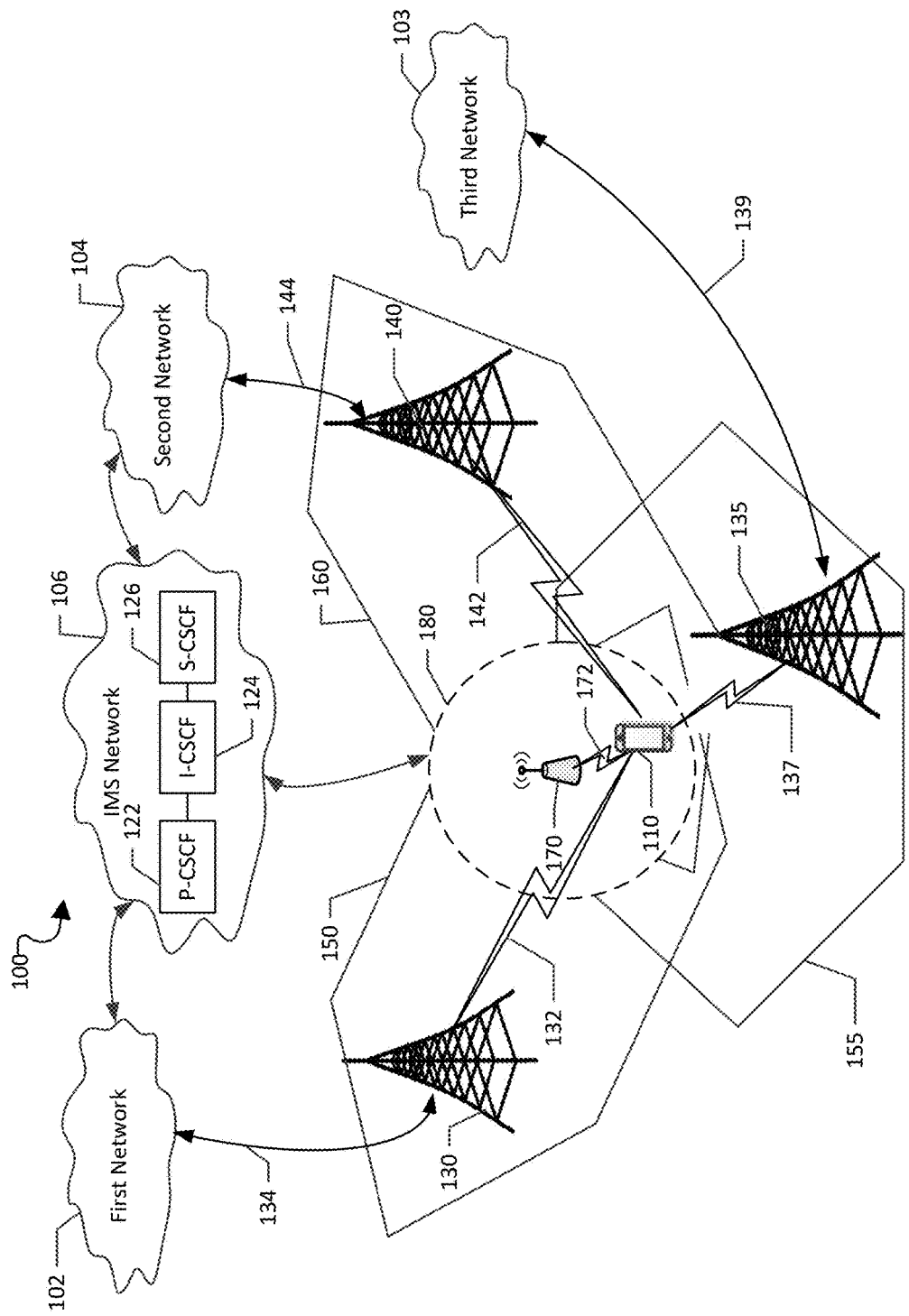
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

A modern communication device, referred to herein as a wireless communication device, User Equipment (UE), or Mobile Station (MS), may include one or more of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide access to one or multiple separate mobile communication networks. The access to mobile communication networks may be facilitated by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more networks with one SIM being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when a third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more networks with two or more SIMs being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Embodiments described herein relate to efficiently utilizing resources for a Multi-SIM-Multi-Standby (MSMS) wireless communication device. In some embodiments, the wireless communication device has a first subscription used for Internet Protocol (IP) Multimedia Subsystem (IMS) and a second subscription designated for data services (DDS). The IMS may enable IMS services such as, but not limited to, Voice-Over-LTE (VoLTE), Video Technology (VT), Short Messaging Services (SMS), Rich Communication Services (RCS), File To Protocol (FTP) services, video sharing services, and/or the like. The IMS subscription is attached to a cell of a packet-switched network (e.g., LTE network). However, the IMS voice service is not available for the first subscription because VoPS is disabled by the cell, or VoLTE is disabled at the wireless communication device by a user, or Service Specific Access Control (SSAC) barring for VoLTE call is enabled. The wireless communication device determines the cause of IMS voice service being currently unavailable, determines whether a Wireless Local Area Network (WLAN) (e.g., Wi-Fi) is available at the IMS subscription, and conducts voice service based on the cause of IMS voice service being unavailable and the availability of the WLAN.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Various examples may be implemented within a communication system 100, an example of which is illustrated in FIG. 1. Referring to FIG. 1, a first network 102 (e.g., a first mobile network), second network 104 (e.g. a second mobile network), and third network 103 (e.g., a third mobile network) may each associate with a plurality of cellular base stations. For instance, a first base station 130 may provide the first network 102 in a first serving cell 150. A second base station 140 may provide the second network 104 in a second serving cell 160. A third base station 135 may provide the third network 103 in a third serving cell 155. A WLAN access point 170 may enable a wireless network (i.e., the WLAN) in a wireless coverage area 180. As used herein, the term "WLAN" refers to any wireless technology for a local area network, such as but not limited to, Wi-Fi, Bluetooth, WiMAX, etc. In further embodiments, the WLAN may be an industrial WLAN (IWLAN). A wireless communication device 110 may be associated with (within effective boundaries of) the first serving cell 150, the second serving cell 160, and the wireless coverage area 180.

Illustrating with a non-limiting example, one or more of the first mobile network 102 and the second mobile network 104 may be connected to an IMS network 106. The WLAN operated by the access point 170 may also be connected to the IMS network 106 through, for example, the Internet. The IMS network 106 may include various IMS servers for providing session and media control, such as but not limited to, one or more Proxy Call Session Control Function (CSCF) (P-CSCF) 122, one or more Interrogating CSCF (I-CSCF) 124, and one or more Serving CSCF (S-CSCF) 126.

The first base station 130 may be in communication with the first network 102 over a wired or wireless connection 134. The second base station 140 may be in communication with the second network 104 over a wired or wireless connection 144. The third base station 135 may be in communication with the third network 103 over a wired or wireless connection 139. The wireless communication device 110 may be in communication with the first network 102 through a first cellular connection 132 to the first base station 130. The first cellular connection 132 may correspond to a first RAT on a first subscription (e.g., over a first SIM) of the wireless communication device 110. The wireless communication device 110 may be in communication with the second network 104 through a second cellular connection 142 to the second base station 140. The second cellular connection 142 may correspond to a second RAT on a second subscription (e.g., over a second SIM) of the wireless communication device 110. The wireless communication device 110 may be in communication with the third network 103 through a third cellular connection 137 to the third base station 135. The third cellular connection may correspond to a third RAT on the first subscription of the wireless communication device 110.

Each of the first cellular connection 132, second cellular connection 142, and third cellular connection 137 may be two-way wireless communication links. Examples of each of the first RAT, second RAT, and third RAT may include, but not limited to, FDMA, TDMA, CDMA (e.g., EVDO), UMTS (e.g., TDS, WCDMA, LTE, HSDPA, or the like), GSM, 1×, GPRS, Wi-Fi, PCS, and/or another protocol used in a wireless communications network or a data communications network. By way of illustrating with a non-limiting example, the first RAT (employed by the cellular connection 132) and the second RAT (employed by the second cellular connection 142) may be a packet-switched cellular network that can enable VoPS, for example, the first RAT may be LTE that can enable VoLTE services. The third RAT (employed by the third cellular connection 137) may be 2G or 3G (e.g., GSM, CDMA) that can enable Circuit Switching (CS) services.

Each of the first base station 130, the second base station 140, and the third base station 135 may include at least one antenna group or transmission station located in the same or different areas. The at least one antenna group or transmission station may be associated with signal transmission and reception. Each of the first base station 130, the second base station 140, and the third base station 135 may include one or more processors, modulators, multiplexers, demodulators, demultiplexers, antennas, and the like for performing the functions described herein. In some examples, each of the first base station 130, the second base station 140, and the third base station 135 may be an access point, Node B, evolved Node B (eNodeB or eNB), base transceiver station (BTS), or the like.

In various examples, the wireless communication device 110 may be configured to access the first network 102, the second network 104, and the third network 103 by virtue of the multi-SIM and/or multi-mode SIM configuration of the wireless communication device 110. When a SIM corresponding to a subscription is inserted, the wireless communication device 110 may access the mobile communication network associated with that subscription based on the information stored on the SIM through registrations and call setups.

The wireless communication device 110 may be in connection with the WLAN access point 170 through a wireless connection 172. The access point 170 operates the WLAN and connects to the Internet and the IMS network 106. The wireless connection 172 may be a two-way radio link enabled by, for example, IEEE 802.11 standards (e.g., 802.11a/b/g/n/ac). In some examples, the wireless connections 172 is a Wi-Fi link operating in the 2.4 GHz and/or 5 GHz frequency bands of the electromagnetic spectrum associated with radio wave propagation. It should be understood that Wi-Fi is used here for illustration but not for limitation. Other WLAN technologies can be used to establish the WLAN, such as but not limited to Wi-Fi, Bluetooth, WiMAX, etc.

The WLAN access point 170 may include at least one antenna group associated with signal transmission and reception. The access point 170 may also include one or more processors, modulators, multiplexers, demodulators, demultiplexers, and the like for performing the functions described herein. In some examples, the WLAN access point 170 is a Wi-Fi modem/router, which may operate in various settings, such as but not limited to a residential setting as a home Wi-Fi network, a commercial/retail setting as a Wi-Fi hotspot, or an industrial setting as an industrial Wi-Fi network. In various examples, the wireless communication device 110 may connect to the access point 170 by virtue of a WLAN interface of the wireless communication device 110 (e.g., via the wireless connection 172).

The wireless communication device 110 may be in communication with the IMS network 106 via the first network 102, the second network 104, and/or the WLAN. The IMS may enable convergence of voice, text, and multimedia services over an all-IP network and support VoLTE, SMS, RCS, and/or the like. The IMS may use Session Initiation Protocol (SIP) for negotiating and establishing a media session (e.g., a VoLTE call) between two IP addresses. Using IMS and SIP, the wireless communication device 110 can exchange text, voice, and/or multimedia packet switched (PS) communication with the IMS network 106.

The IMS network 106 may include network entities (e.g., IMS servers) for session management and routing, service support, databases, and interworking. In various examples, Call Session Control Function (CSCF) is responsible for establishing, monitoring, supporting, and releasing multimedia sessions. CSCF may include one or more P-CSCF 122, one or more I-CSCF 124, and one or more S-CSCF 126, which may be implemented in one physical entity or in separate physical entities. The P-CSCF 122 is the initial point of contact for the wireless communication device 110, which handles requests from the wireless communication device 110 and is the "proxy" to the entire IMS. The P-CSCF 122 may include a Policy Control Function (PCF) for enforcing Quality of Service (QoS) policies on media. The I-CSCF 124 is a liaison between the wireless communication device 110 (via the P-CSCF 122) and the S-CSCF 126, which assigns the wireless communication device 110 to the S-CSCF 126 during registration. The S-CSCF 126 is a decision point as to whether the messages from the wireless communication device 110 will be forwarded to application servers.

Figure 2:
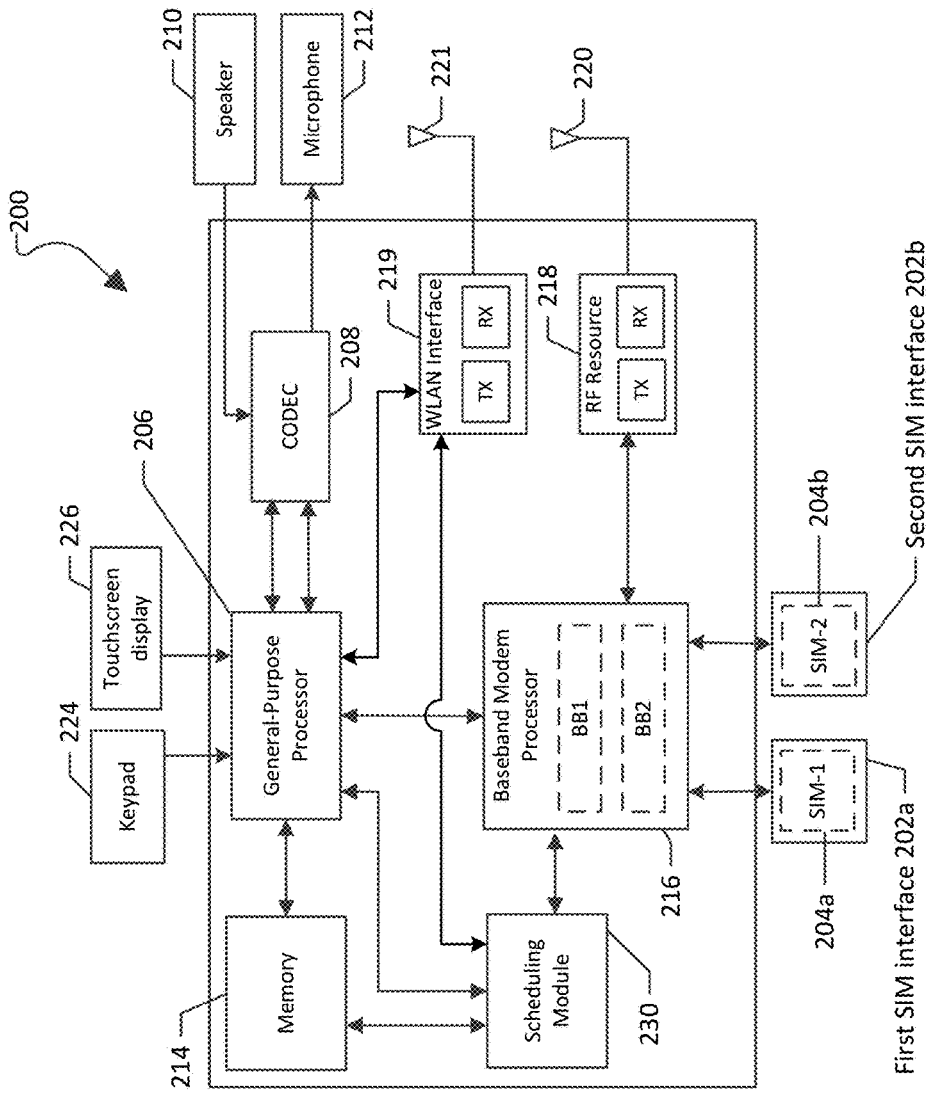
FIG. 2 is a component block diagram of a wireless communication device according to various examples.

FIG. 2 is a functional block diagram of a wireless communication device 200 suitable for implementing various examples. The wireless communication device 200 may be the wireless communication device 110 as described with reference to FIG. 1. Referring to FIGS. 1-2, the wireless communication device 200 may include a first SIM interface 202a, which may receive or otherwise include a first SIM 204a that is associated with the first network 102. The wireless communication device 200 may include a second SIM interface 202b, which may receive or otherwise include a second SIM 204b that is associated with the second network 104. In various examples, the first SIM 204a is utilized for IMS services while the second SIM 204b is designated for data services.

A SIM (e.g., the first SIM 204a, the second SIM 204b, or the like) in various examples may be a Universal Integrated Circuit Card (UICC) that is configured with SIM and/or Universal SIM (USIM) applications, enabling access to GSM and/or UMTS and LTE networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Network (HPLMN) code, etc.) to indicate the SIM card network operator provider.

The wireless communication device 200 may include at least one WLAN interface 219, which includes a wireless receiver, transmitter, transceiver, and/or other elements that enable the wireless communication device 200 to connect to the WLAN access point 170 (e.g., via the wireless connection 172). In some examples, the WLAN interface 219 can be a Peripheral Component Interconnect (PCI) adapter card or a built-in card integrating Wi-Fi and Bluetooth communication functions. The card may be identified by a unique wireless media access control (MAC) address, which can be used as a network address in accordance with, for example, the IEEE 802.11 standards. The WLAN interface 219 may use other WLAN technologies additionally or alternatively. The WLAN interface 219 is connected to at least one antenna 221 for transmitting and receiving radio signals to/from the WLAN access point 170. In some examples, the antenna 221 is tuned to transmit and receive signals in the 2.4 GHz and/or 5 GHz frequency bands in accordance with the IEEE 802.11 standards.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may include a non-transitory processor-readable storage medium that stores processor-executable instructions. For example, the instructions may include routing communication data relating to the first or second SIM though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the first SIM 204a, the second SIM 204b, and/or the like) in the wireless communication device 200 may be associated with at least one baseband-RF resource chain. A baseband-RF resource chain may include the baseband modem processor 216, which may perform baseband/modem functions for communications over the SIMs 204a and 204b. The baseband modem processor 216 may include or may be otherwise coupled to one or more amplifiers and radios, referred to generally herein as RF resource 218 or RF chain.

The RF resource 218 may include at least one transceiver that perform transmit/receive functions for the associated SIMs 204a and 204b of the wireless communication device 200. The RF resource 218 may include separate transmit and receive circuitries, or may include a transceiver that combines transmitter and receiver functions. The RF resource 218 may be coupled to a wireless antenna 220. The RF resource 218 may also be coupled to the baseband modem processor 216.

The examples described herein may be applicable to wireless communication devices in which the SIMs 204a and 204b share a common set of RF resource (particularly, the RF resource 218). Examples described herein may be applicable to wireless communication devices in which each of the SIMs 204a and 204b has a separate RF resource, but activities of one of the SIMs 204a and 204b may be deactivated while the other one of the SIMs 204a and 204b is active.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230 capable of performing the functions described herein with respect to conducting voice service (e.g., voice calls). The scheduling module 230 may communicate with the software layers corresponding to the first subscription, the second subscription, and the WLAN connection. Particularly, the scheduling module 230 may communicate with the software layer corresponding to the first subscription/second subscription to obtain information on availability of voice services, and communicate with the software layer corresponding to the WLAN connection to obtain information on availability/performance of the WLAN connection. The scheduling module 230 may use the information to schedule voice service in the manner described herein.

In some examples, the scheduling module 230 may be implemented within the general-purpose processor 206. For example, the scheduling module 230 may be implemented as software stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the scheduling module 230. For example, the scheduling module 230 may be implemented as a separate processing component (i.e., separate from the general-purpose processor 206). In yet other examples, a portion of the scheduling module 230 may be implemented within the general-purpose processor 206 and the rest may be implemented with dedicated hardware. The scheduling module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an Original Equipment Manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional networks.

Figure 3A:
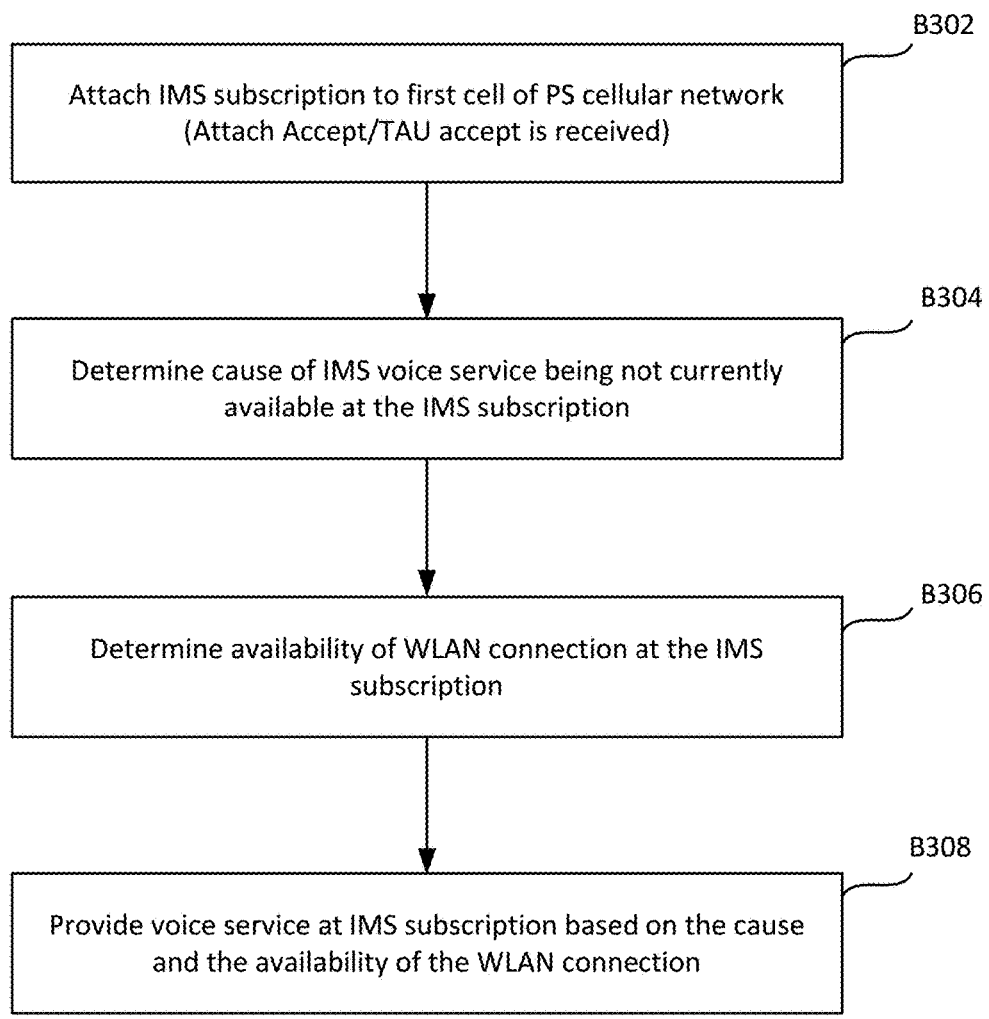
FIG. 3A is a process flowchart diagram illustrating a method of conducting voice service for a wireless communication device according to various examples.

FIG. 3A is a process flowchart diagram illustrating a method 300 of conducting voice service for a wireless communication device according to various examples. Referring to FIG. 1-3A, the scheduling module 230 or the general-purpose processor 206 may be adapted or may be otherwise capable of performing the method 300 in some examples. As discussed above with reference to FIG. 1, in some embodiments, the first and second networks 102 and 104 may be a packet-switched cellular network (e.g., LTE network). The third network 103 may be a circuit-switched cellular network (e.g., GSM/WCDMA/1×, etc.). In some examples, the first subscription associated with the first SIM module 204a is set as a voice only service subscription with a priority for using IMS service. In other words, IMS is used to provide voice, video, and other multimedia services over the first subscription wherever possible. If IMS is not available on the first subscription, CSFB mode or other circuit-switched RAT may be used. Thus, the first subscription is also referred to as IMS subscription in this disclosure. The second subscription associated with the second SIM module 204b may be set as a Designated Data Service (DDS) subscription for providing data service in some examples. The second subscription may also use IMS.

At block B302, the first subscription (i.e., the IMS subscription) of the wireless communication device 200 may be attached to a first cell of a packet-switched cellular network (i.e., the first network 102). Network attachment is also referred to as registration or camping. If the RAT associated with the first network 102 is LTE, the registration may include the initial registration when the wireless communication device 200 is attached to the LTE network for the first time and subsequent Tracking Area Updating (TAU) performed periodically or per event. The wireless communication device 200 may initiate the attachment procedure by transmitting an Attach Request to the first base station 130 (e.g., an eNodeB). The Attach Request may include various Information Elements (IEs) used to identify the wireless communication device 200 and specify parameters for network connection. The IEs may include Evolved Package System (EPS) attach type, EPS mobile identity, network capability, usage setting, voice domain preference, last visited registered Tracking Area Identity (TAI), and so on.

Upon receiving the Attach Request, the first network 102 may perform, among others, LTE authentication and security measurement with the wireless communication device 200. If successful, the first network 102 may send an Attach Accept message to the wireless communication device 200 to indicate that the Attach Request has been accepted. The Attach Accept message may include various IEs used to specify parameters for network connection and indicate support or no support of various features. The IEs may include EPS attach result, Voice over Packet-switched Session (VoPS), TAI list, location services indicator in circuit switch, and so on.

After the wireless communication device 200 is attached to the first network 102 at the first subscription for the first time, the wireless communication device 200 may either periodically or per event initiate the TAU procedure to update its location registration with the first network 102. The wireless communication device 200 may initiate the TAU procedure by sending a TAU Request, which may include various IEs such as EPS update type, EPS bearer context status, non-access stratum (NAS) key set identifier, network capability, usage setting, voice domain preference, last visited registered TAI, and so on. If the TAU Request has been accepted, the first network 102 may send a TAU Accept message to the wireless communication device 200. The TAU Accept may include various IEs such as EPS update result, VoPS, TAI list, location services indicator in CS, and so on. The IMS subscription may be camped on the first serving cell 150 after the network attachment.

At block B304, a cause of IMS voice service being currently not available at the IMS subscription is determined. The wireless communication device 200 may be connected with the IMS network 106 via the first network 102 in order to provide IMS services such as VoLTE, VT, SMS, RCS, etc. However, IMS voice service may not be always available for various reasons. In some situations, IMS voice is not available because VoPS is disabled by the first serving cell 150 to which the wireless communication device 200 is attached. As discussed above, in the Attach Accept message or TAU Accept message, the first network 102 may indicate whether VoPS is supported by the serving cell to which the wireless communication device 200 is currently attached to. In some embodiments, VoPS is a one-bit indicator. VoPS=1 indicates that VoPS is supported (and thus IMS voice service is available) while VoPS=0 indicates that VoPS is not supported (and thus IMS voice service is not available). Different LTE cells may return different VoPS indicators. For example, VoPS may be not supported by one cell but supported by another cell.

In other situations, IMS voice service is not available because VoLTE is disabled at the wireless communication device 200 by, for example, a user. The user may set the "VoLTE" item in the usage setting as "Disabled" through, for example, the keypad 224, the touchscreen display 226, and/or the microphone 212 (e.g., by voice command).

In yet other situations, IMS voice service is not available because Service Specific Access Class (SSAC) barring for VoLTE call is enabled. LTE cell may use SSAC barring to prevent or restrict the wireless communication device 200 from attempting to access the cell for a specific service. In particular, the first base station 130 may broadcast SSAC barring information via, for example, System Information Block (SIB). In some embodiments, the SIB may include a ssac_barringForMMTEL-voice field, which indicates service specific class barring for IMS multimedia telephony service (MMTel) voice applications. The ssac_BarringForMMTEL-voice field may include a barring factor and a barring timer—SSAC barring is not a permanent blockage of the wireless communication device 200 from accessing the service, but only for a certain duration. In some embodiments, the barring factor has a value from 0 to 0.95 in steps of 0.5. The barring timer has a value of 4, 8, 16, 32, 64, 128, 256, or 512 second. To find out whether the SSAC barring for VoLTE call is enabled, the wireless communication device 200 may generate a random number between 0 and 1. If the random number is less than the barring factor, SSAC barring is treated as not enabled. Otherwise, SSAC barring for VoLTE call is treated as enabled and the barring timer is used to determine a period of time during which the wireless communication device 200 is not allowed to re-attempt the access.

At block B306, availability of a WLAN connection at the IMS subscription is determined. Because data usage on WLAN has a relatively low cost compared to data usage on cellular networks (e.g., 2G, 3G, 4G, 5G), the wireless communication device 200 may connect to WLAN when available. In various examples, the WLAN access point 170 is a Wi-Fi router/modem/hotspot, broadcasting its unique service set identifier (SSID). Upon entering the wireless coverage area 180 associated with the access point 170, the wireless communication device 200 can detect the SSID broadcast by the access point 170. The wireless communication device 200 may request to join the WLAN operated by the access point 170. The access point 170 may acknowledge or declining the request. The wireless communication device 200 joins the WLAN upon acknowledgement by the access point 170. If the wireless communication device 200 is not within the coverage area 180, it may be determined that the WLAN connection is not available.

At block B308, voice service is provided at the IMS subscription based on the cause of IMS voice service being not available and the availability of the WLAN connection. The method 300 may implement different processes to conduct voice service based on different causes of IMS voice service being not available and the presence/absence of WLAN connection at the IMS subscription. Details are discussed below with reference to FIGS. 4A through 6B.

Figure 3B:
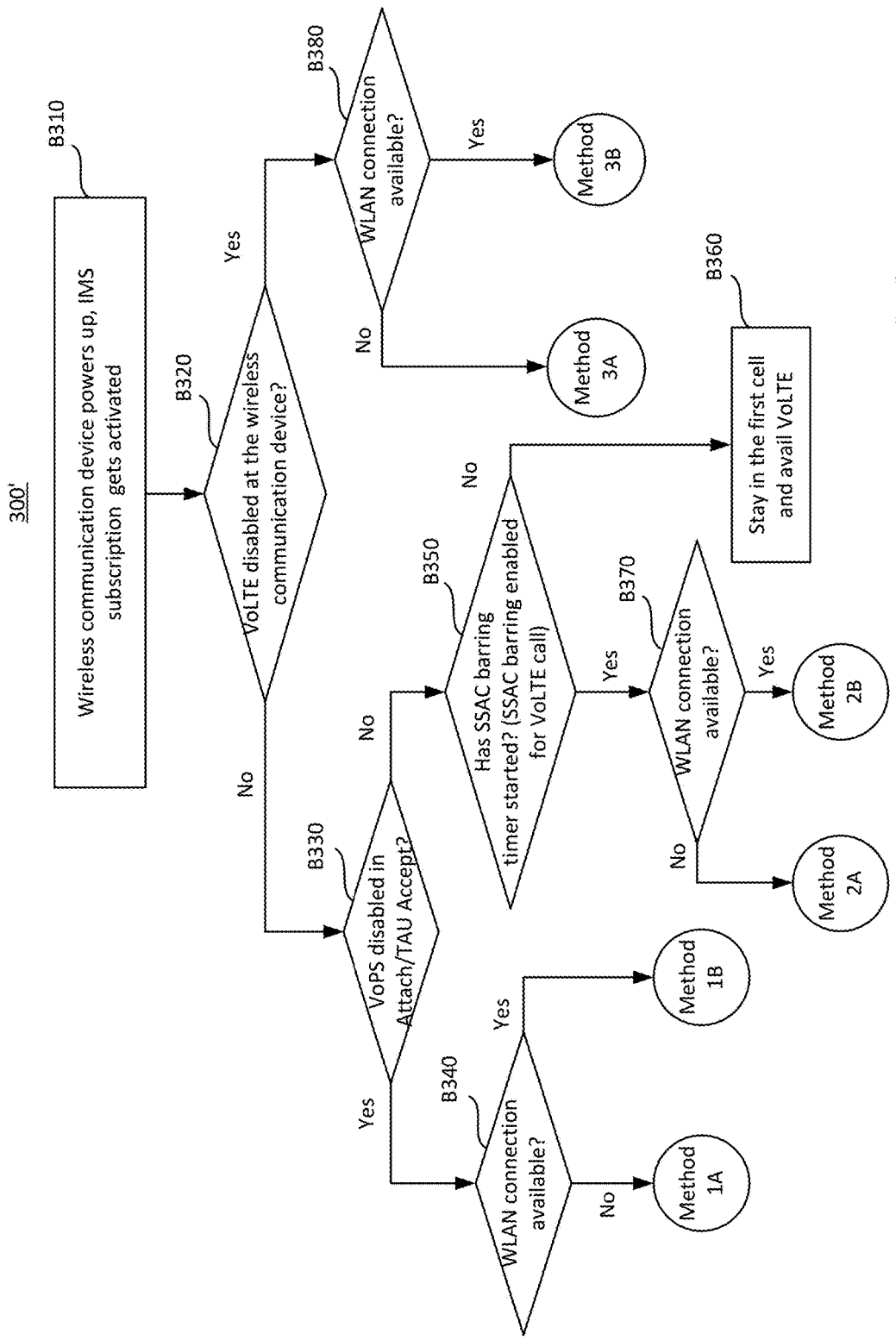
FIG. 3B is a process flowchart diagram illustrating a method of conducting voice service for a wireless communication device according to various examples.

FIG. 3B is a process flowchart diagram illustrating a method 300' of conducting voice service for a wireless communication device according to various examples. Referring to FIG. 1-3B, the scheduling module 230 or the general-purpose processor 206 may be adapted or may be otherwise capable of performing the method 300' in some examples. One or more of blocks B310-B360 of FIG. 3B may correspond to one of blocks B302-B308 of FIG. 3A.

At block B310, the wireless communication device 200 powers up and the first subscription (i.e., the IMS subscription) is activated.

At block B320, it is determined whether VoLTE is disabled at the wireless communication device. If it is determined that VoLTE is not disabled, at block B320, the method 300' proceeds to determine whether VoPS is disabled by the first cell (i.e., indicated in the Attach/TAU Accept message). If it is determined that VoPS is disabled by the first cell as indicated in the Attach/TAU Accept message, at block B330, the method 300' proceeds to determine whether a WLAN connection is available at the IMS subscription, at block B340. If it is determined that the WLAN connection is not available, a method 1A may be executed, which is illustrated with reference to FIG. 4A. If it is determined that a WLAN connection is available at the IMS subscription, a method 1B may be executed, which is illustrated with reference to FIG. 4B.

If it is determined that VoPS is not disabled by the first cell (i.e., the Attach/TAU Accept message indicates VoPS is enabled), at block B330, then the unavailability of IMS voice service may be caused by the SSAC barring for VoLTE call being enabled. The method 300' proceeds to determine whether the SSAC barring timer has started, at block B350. If it is determined that the SSAC barring timer has not started, at block B350, the wireless communication device 200 may stay in the current cell (i.e., the first cell) and avail VoLTE services, at block B360. If it is determined that the SSAC barring timer has started, at block B350, the method 300' proceeds to determine whether a WLAN connection is available at the IMS subscription, at block B370. If it is determined that the a WLAN connection is not available, a method 2A may be executed, which is illustrated with reference to FIG. 5A. If it is determined that a WLAN connection is available at the IMS subscription, a method 2B may be executed, which is illustrated with reference to FIG. 5B.

If it is determined that VoLTE is disabled at the wireless communication device 200 (e.g., by a user), at block B320, the method 300' proceeds to determine whether a WLAN connection is available at the IMS subscription, at block B380. If it is determined that a WLAN connection is not available, a method 3A may be executed, which is illustrated with reference to FIG. 6A. If it is determined that a WLAN connection is available at the IMS subscription, a method 3B may be executed, which is illustrated with reference to FIG. 6B.

Referring to FIG. 4A, a process flowchart diagram illustrates a method 400 of conducting voice service in a situation in which VoPS is disabled by a packet-switched cell to which the IMS subscription of the wireless communication device 200 is currently attached and a WLAN connection is not available at the IMS subscription according to various examples. Referring to FIG. 1-4A, the scheduling module 230 or the general-purpose processor 206 may be adapted or may be otherwise capable of performing the method 400 in some examples.

At block B411, the scheduling module 230 or the general-purpose processor 206 may bar the Tracking Area Identity (TAI) associated with the first packet-switched cell (e.g., LTE cell) to which the wireless communication device 200 is currently attached for a period of time. When camped on the first LTE cell, the wireless communication device 200 may receive and respond to paging messages through the first LTE cell. When the TAI associated with the first LTE cell is barred, the wireless communication device no longer communicates with the first LTE cell or any other cell(s) associated with the same TAI. Furthermore, the wireless communication device will not camp on the first LTE cell and any other cell(s) associated with the same TAI for a period of time. Value of the period of time may be chosen based on, for example but not limited to, tests and/or past experiences for achieving an optimal user experience. The period of time may be, for example, 10 minutes, 20 minutes, 30 minutes, a hour, two hours, ten hours, and so on. In some embodiments, the value may be stored in memory 214 of the wireless communication device 200.

At block B413, it is determined whether a second packet-switched cell associated with a different TAI is available for IMS voice service. Not being camped on the first cell, the wireless communication device 200 may perform a cell reselection process to select another cell to camp on. As discussed above, cell(s) associated with the same TAI as the first cell is barred from being selected. The wireless communication device 200 may detect and measure neighbor cells and send Attach or Tracking Area Update (TAU) Request to cell(s) that satisfies the reselection criteria. Upon receiving Attach or TAU Accept message from a cell, The wireless communication device 200 may check the VoPS indicator included in the Attach Accept message. If the VoPS indicator indicates that VoPS is supported, it is determined that the second cell is available for IMS voice service and the wireless communication device 200 may be camped on the second cell. If there are no LTE cells that satisfy the reselection criteria or if no candidate cells return a supporting VoPS indicator, it is determined that the second LTE cell is not available for IMS voice service.

If it is determined that a second LTE cell associated with a different TAI is available for IMS voice service at block B413, the wireless communication device 200 may conduct IMS voice service through the second LTE cell at block B415.

If it is determined that a second LTE cell is not available for IMS voice service at block B413, the wireless communication device may conduct voice service through a circuit-switched cellular network at block B417. The circuit-switched cellular network may be a legacy 2G/3G network. The wireless communication device 200 may initiate an inter-RAT cell reselection to move to the circuit-switched network. In particular, the wireless communication device 200 may detect and measure neighbor circuit-switched cells and camp on a circuit-switched cell (e.g., the third serving cell 155) that satisfies the cell selection or reselection criteria. In some embodiments, the wireless communication device 200 may first detect and measure cells associated with the Location Area Identity (LAI) included in the Attach Accept/TAU Accept message received from the first network 102. If no suitable circuit-switched cells are found, the wireless communication device 200 may search for other circuit-switched cells. The wireless communication device 200 may then conduct mobile originated (MO) call and/or mobile terminated (MT) call through the third serving cell 155 to which it is attached.

Referring to FIG. 4B, a process flowchart diagram illustrates a method 400' of conducting voice service in a situation in which VoPS is disabled by a packet-switched cell to which the IMS subscription of the wireless communication device 200 is currently attached and a WLAN connection is available at the IMS subscription according to various examples. Referring to FIG. 1-4B, the scheduling module 230 or the general-purpose processor 206 may be adapted or may be otherwise capable of performing the method 400' in some examples. One or more of blocks B412-B422 of FIG. 4B may correspond to one of blocks B411-B417 of FIG. 4A.

At block B412, the scheduling module 230 or the general-purpose processor 206 may bar a TAI associated with the first packet-switched cell for a period of time, to which the wireless communication device 200 is currently attached. As discussed with reference to block B411 of FIG. 4A, the wireless communication device 200 may bar the communication with the first cell or any other cell(s) associated with the same TAI. Furthermore, the wireless communication device 200 will not camp on the first LTE cell and any other cell(s) associated with the same TAI for a period of time.

At block B414, it is determined whether a signal strength of the WLAN connection is greater than a signal strength threshold. In some embodiments, the WLAN connection signal strength may be indicated or otherwise based on the Received Signal Strength Indicator (RSSI) measured at the wireless communication device 200. The WLAN connection signal strength may vary with the distance between the wireless communication device 200 and the WLAN access point 170. For example, the further the wireless communication device 200 is away from the access point 170, the weaker the radio signal may be. The signal strength threshold may be a predetermined value (e.g., predetermined RSSI) chosen based on, for example but not limited to, tests and/or past experiences for achieving an optimal user experience. In some embodiments, the value may be stored in memory 214 of the wireless communication device 200.

If it is determined that the WLAN connection signal strength is greater than the signal strength threshold at block B414, the wireless communication device 200 may conduct IMS voice service through the WLAN connection at the IMS subscription. In some embodiments, the wireless communication device 200 may send a SIP Registration Request to the P-CSCF 122 of the IMS network 106 through the WLAN, to request registration with the IMS network 106. Upon receiving the request, the IMS network 106 may perform, among others, authentication of the wireless communication device 200. If successful, the IMS network 106 may send a Registration ACK message to the wireless communication device 200 through the WLAN. The wireless communication device 200 may then be connected to the IMS network 106 and ready to provide IMS voice service through the WLAN.

In some embodiments, the wireless communication device 200 may further deactivate the modem stack at the IMS subscription, such as LTE protocol stack, the GSM protocol stack, the WCDMA stack, the 1× protocol stack, and/or the like. The modem stack may remain deactivated as far as IMS services are available on the WLAN and the WLAN connection signal strength is greater than the signal strength threshold (i.e., Yes for block B414). If the WLAN connection signal becomes no greater than the threshold, the wireless communication device 200 may search for available LTE cells with different TAI than the barred TAI or other 2G/3G cells, as will be described below in detail with reference to blocks B418-B422. The deactivation would not cause missing any MT calls on the IMS subscription as far as the WLAN connection is good (e.g., the WLAN connection signal strength is greater than the signal strength threshold) because the cellular network(s) would wait for a period of time before sending pages on circuit-switched domain if a MT call fails on the WLAN. The wireless communication device 200 would have camped on the circuit-switched cellular network by that time. For emergency alerts such as commercial mobile alert system (CMAS), other subscription(s) (e.g., the DDS subscription) may be available when modem stack is deactivated on the IMS subscription.

If it is determined that the WLAN connection signal strength is not greater than (i.e., equal to or less than) the signal strength threshold at block B414, the wireless communication device 200 may determine whether a second packet-switched cell associated with a different TAI is available for IMS voice service, at block B418. As discussed with reference to block B415 of FIG. 4A, the wireless communication device 200 may perform a cell selection or reselection process to search for a second LTE cell that supports VoPS.

If it is determined that a second LTE cell associated with a different TAI is available for IMS voice service at block B418, the wireless communication device may conduct IMS voice service through the second LTE cell at block B420.

If it is determined that a second LTE cell is not available for IMS voice service at block B418, the wireless communication device may conduct voice service through a circuit-switched cellular network at block B422. As discussed with reference to Block B417 of FIG. 4A, the wireless communication device 200 may perform a cell selection or reselection process to identify a circuit-switched cell of 2G/3G RATs (e.g., GSM, WCDMA, 1×, etc.) to camp on. The wireless communication device 200 may camp on the circuit-switched cell and conduct MO/MT call through the circuit-switched cell.

Figures 5A, 5B:
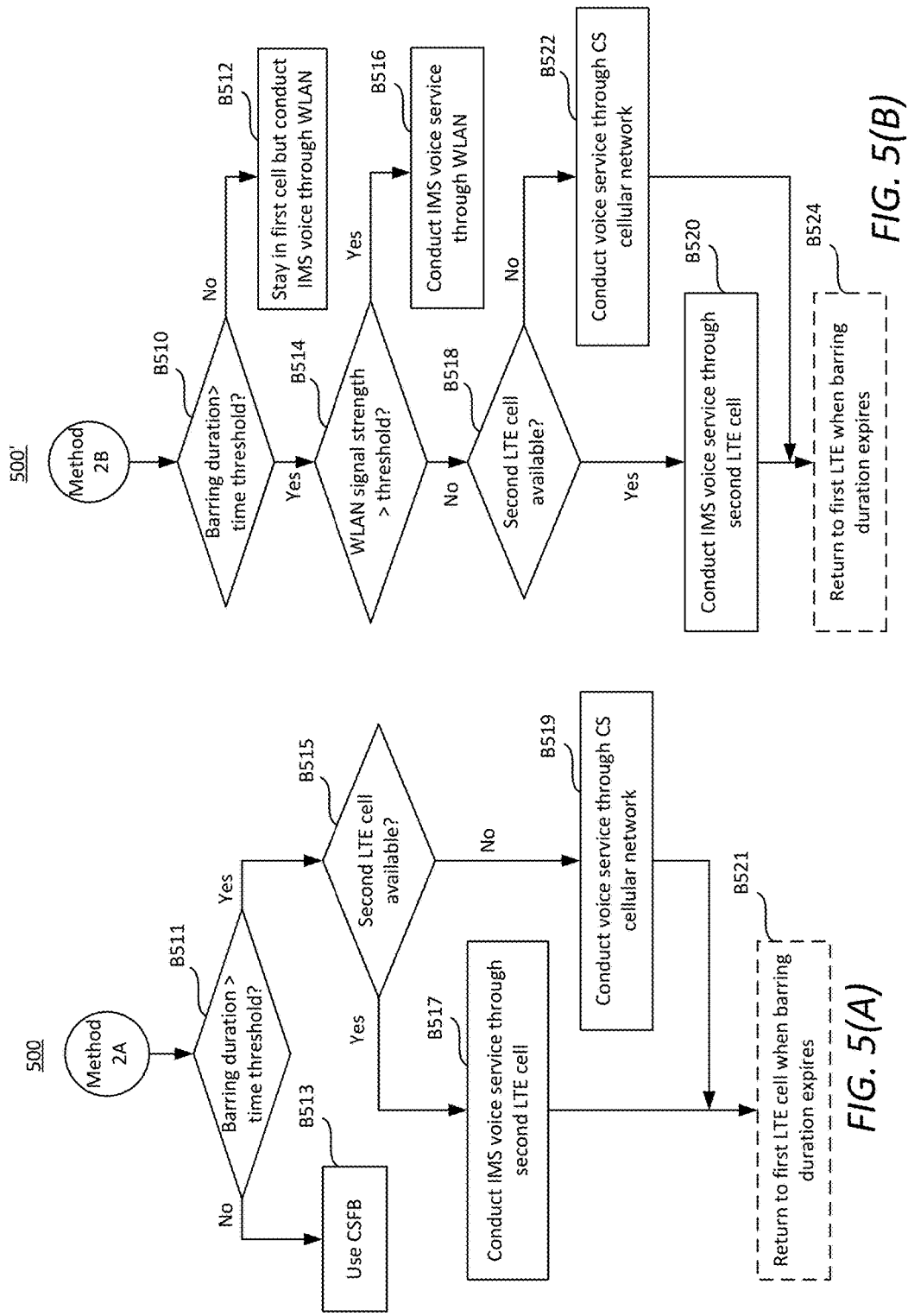
FIG. 5A is a process flowchart diagram illustrating a method for conducting voice service in a situation in which Service Specific Access Control (SSAC) barring for VoLTE call is enabled and a WLAN connection is not available at the IMS subscription according to various examples.
FIG. 5B is a process flowchart diagram illustrating a method for conducting voice service in a situation in which SSAC barring for VoLTE call is enabled and a WLAN connection is available at the IMS subscription according to various examples.

Referring to FIG. 5A, a process flowchart diagram illustrates a method 500 of conducting voice service in which SSAC barring for VoLTE call is enabled and a WLAN connection is not available at the IMS subscription according to various examples. Referring to FIG. 1-5A, the scheduling module 230 or the general-purpose processor 206 may be adapted or may be otherwise capable of performing the method 500 in some examples.

As discussed above, IMS voice service may be unavailable because SSAC barring for VoLTE call (e.g., ssac_barringForMMTEL-voice) is enabled by the first serving cell 150 to which the wireless communication device 200 is currently attached. The ssac_BarringForMMTEL-voice field may include a barring factor and a barring timer for MMTEL-voice. The barring factor may be used to determine whether the SSAC is barred. The barring timer may be used to determine the duration of the barring.

At block B511, it is determined whether a duration of the SSAC barring is greater than a time threshold. The SSAC barring is not a permanent blockage of wireless communication device from accessing the first serving cell 150 for IMS voice service, but only for a certain duration of time. In some embodiments, the duration of barring is indicated by or otherwise determined based on the barring timer associated with the SSAC. The time threshold may be a predetermined value chosen based on, for example but not limited to, tests and/or past experiences for achieving an optimal user experience. The period of time may be, for example, 8 seconds, 9 seconds, 10 seconds, 11 seconds, and so on. In some embodiments, the value may be stored in memory 214 of the wireless communication device 200.

If it is determined that the duration of the SSAC barring is not greater than (i.e., equal to or less than) the time threshold at block B511, the wireless communication device 200 may stay in current LTE cell and conduct voice service using CSFB, at block B513. To use CSFB, the wireless communication device 200 may register with both the packet-switched cellular network (e.g., LTE network) and the circuit-switched cellular network (e.g., 2G/3G network). For voice service, the packet-switched network functions as an intermediary between the wireless communication device and the circuit-switched cellular network. When the wireless communication device 200 is to originate a voice call, it sends an Extended Service Request Message (ESRM) to the LTE network (e.g., Mobility Management Entity (MME) of the first network 102). The MME checks whether the wireless communication device 200 is capable of CSFB and notifies the first base station 130 to transfer the wireless communication device to circuit-switched domain. The first base station 130 may initiate an inter-RAT cell reselection process to move the wireless communication device to a circuit-switched cell (e.g., the second serving cell 160). The wireless communication device then conducts the MO call through the circuit-switched cell. When the MO call is over, the wireless communication returns to the packet-switched network (e.g., LTE cell).

When a voice call comes in, the call request first reaches the circuit-switched network (e.g., the Mobile Switching Center (MSC) of the third network 103). The MSC sends paging messages to a related MME via Serving Gateways (SGs) interface. The MME network forwards the paging messages to the wireless communication device 200. If the call is accepted, the wireless communication device 200 sends an ESRM to the MME, which notifies the first base station 130 to transfer the wireless communication device 200 to circuit-switched domain. The first base station 130 may initiate an inter-RAT cell reselection or redirection process to move the wireless communication device to a circuit-switched cell (e.g., the third serving cell 155). The wireless communication device 200 then conducts the MT call through the CS cell. When the MT call is over, the wireless communication returns to the packet-switched network (e.g., LTE cell).

If it is determined that the duration of the SSAC barring is greater than the time threshold at block B511, the wireless communication device 200 may determine whether a second LTE cell is available for IMS voice service at block B515. The wireless communication device 200 may perform a cell selection or reselection process to search for a second LTE cell that supports VoPS.

If it is determined that a second LTE cell is available for IMS voice service at block B515, the wireless communication device may conduct IMS voice service through the second LTE cell at block B517.

If it is determined that a second LTE cell is not available for IMS voice service at block B515, the wireless communication device may conduct voice service through a circuit-switched cellular network at block B519. The wireless communication device 200 may perform a cell selection or reselection process to identify a circuit-switched cell of 2G/3G RATs (e.g., GSM, WCDMA, 1×, etc.) to camp on and conduct MO/MT call through the circuit-switched cell.

Optionally, at block 521, the wireless communication device 200 returns to the first packet-switched cell (e.g., the first serving cell 150) in response to that the duration of the SSAC barring expires. When the SSAC barring duration expires, the first cell may allow the wireless communication device 200 to access for IMS voice service.

Referring to FIG. 5B, a process flowchart diagram illustrates a method 500' of conducting voice service when SSAC barring for VoLTE is enabled and a WLAN connection is available at the IMS subscription according to various examples. Referring to FIG. 1-5B, the scheduling module 230 or the general-purpose processor 206 may be adapted or may be otherwise capable of performing the method 500' in some examples. One or more of blocks B510-B524 of FIG. 5B may correspond to one of blocks B511-B521 of FIG. 5A.

At block B510, it is determined whether a duration of the SSAC barring is greater than a time threshold. As discussed with reference to block B511 of FIG. 5A, the duration of barring may be indicated by or otherwise determined based on the barring timer associated with the SSAC barring. The time threshold may be a predetermined value stored in memory 214.

If it is determined that the duration of the SSAC barring is not greater than the time threshold at block B510, the wireless communication device 200 may conduct IMS voice service through the WLAN connection at the IMS subscription, at block B512. In some embodiments, the wireless communication device 200 may stay in the first packet-switched cell but skip reading paging messages for MT calls. If a MO call is originated or a MT call is received, the wireless communication device 200 may register with the IMS network 106 through the WLAN and conduct IMS voice service over the WLAN.

If it is determined that the duration of the SSAC barring is greater than the time threshold at block B510, it is determined whether a signal strength of the WLAN connection is greater than a signal strength threshold, at block B514. The WLAN connection signal strength may be indicated or otherwise based on the RSSI measured at the wireless communication device 200. The signal strength threshold may be a predetermined value stored in memory 214.

If it is determined that the WLAN connection signal strength is greater than the signal strength threshold at block B514, the wireless communication device 200 may conduct IMS voice service through the WLAN connection at the IMS subscription, at block B516. The wireless communication device 200 may further deactivate the modem stack at the IMS subscription. The difference between the blocks B512 and the B516 is that, at B512, the wireless communication device 200 may still camp on the first LTE cell, while at B516, the LTE stack is deactivated and the device 200 no longer camps on the first LTE cell.

If it is determined that the WLAN connection signal strength is not greater than the signal strength threshold at block B514, the wireless communication device 200 may determine whether a second LTE cell is available for IMS voice service, at block B518. The wireless communication device 200 may perform a cell selection or reselection process to search for a second LTE cell that supports VoPS.

If it is determined that a second LTE cell is available for IMS voice service at block B518, the wireless communication device may conduct IMS voice service through the second LTE cell at block B520.

If it is determined that a second LTE cell is not available for IMS voice service at block B518, the wireless communication device may conduct voice service through a circuit-switched cellular network at block B522. The wireless communication device 200 may perform a cell selection or reselection process to identify a circuit-switched cell of 2G/3G RATs (e.g., GSM, WCDMA, 1×, etc.) to camp on and conduct MO/MT call through the circuit-switched cell.

Optionally, at block 524, the wireless communication device 200 returns to the first packet-switched cell when the duration of the SSAC barring expires. When the SSAC barring duration expires, the first LTE cell may allow the wireless communication device 200 to access for IMS voice service.

Figures 6A, 6B:
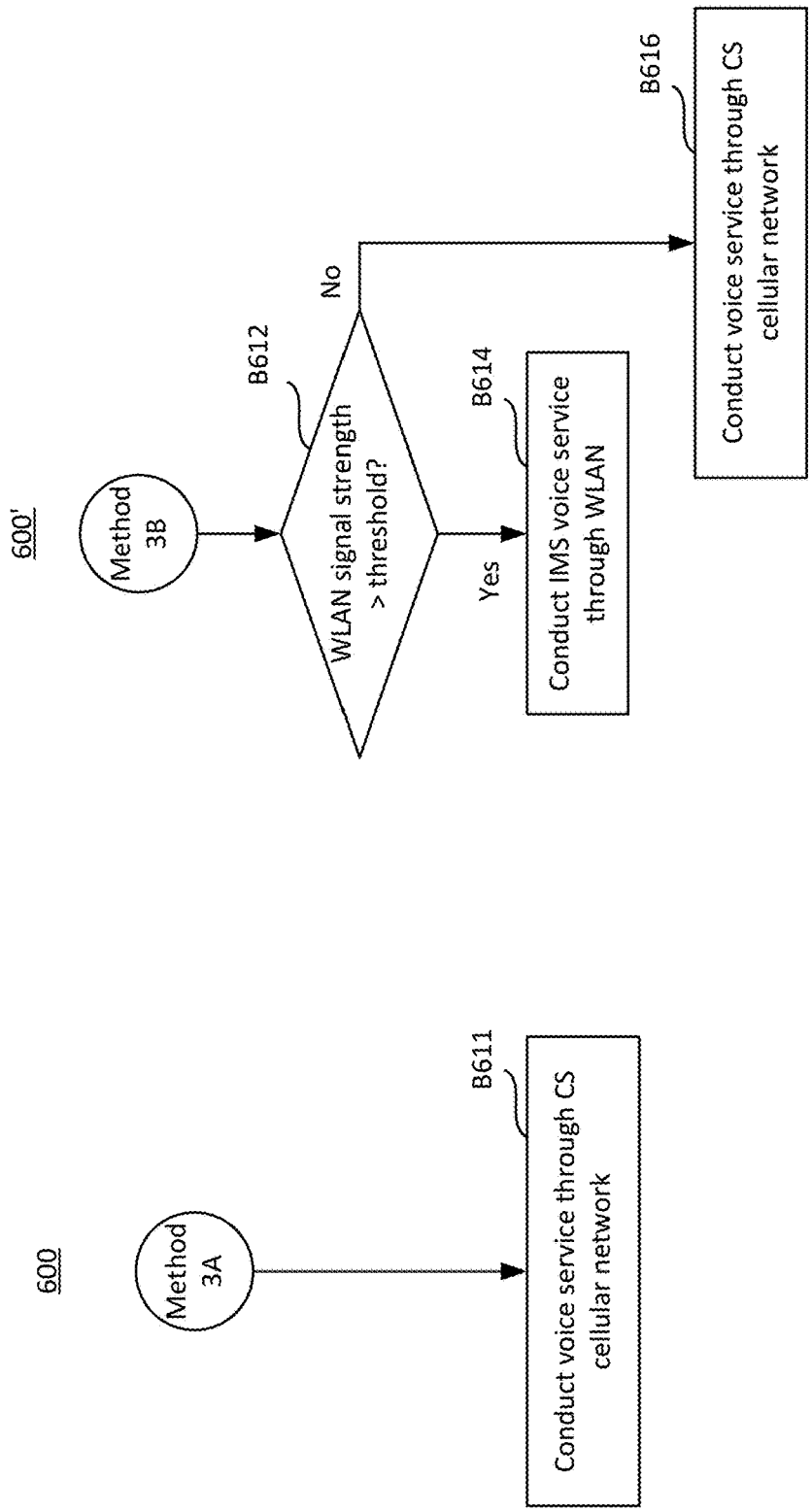
FIG. 6A is a process flowchart diagram illustrating a method for conducting voice service in a situation in which VoLTE is disabled at the wireless communication device and a WLAN connection is not available at the IMS subscription according to various examples.
FIG. 6B is a process flowchart diagram illustrating a method for conducting voice service in a situation in which VoLTE is disabled at the wireless communication device and a WLAN connection is available at the IMS subscription according to various examples.

Referring to FIG. 6A, a process flowchart diagram illustrates a method 600 of conducting voice service in a situation in which VoLTE is disabled at the wireless communication and a WLAN connection is not available at the IMS subscription according to various examples. Referring to FIG. 1-6A, the scheduling module 230 or the general-purpose processor 206 may be adapted or may be otherwise capable of performing the method 600 in some examples.

At block B611, the wireless communication device 200 may conduct voice service through a circuit-switched cellular network. The wireless communication device 200 may perform an inter-RAT cell reselection process to identify a circuit-switched cell to camp on and conduct MO/MT call through the circuit-switched cell.

Referring to FIG. 6B, a process flowchart diagram illustrating a method 600' of selecting a RAT for voice service in a situation in which VoLTE is disabled at the wireless communication and a WLAN connection is available at the IMS subscription according to various examples. Referring to FIG. 1-6B, the scheduling module 230 or the general-purpose processor 206 may be adapted or may be otherwise capable of performing the method 600' in some examples.

At block B612, it is determined whether a signal strength of the WLAN connection is greater than a signal strength threshold. The WLAN connection signal strength may be indicated or otherwise based on the RSSI measured at the wireless communication device 200. The signal strength threshold may be a predetermined value stored in memory 214.

If it is determined that the WLAN connection signal strength is greater than the signal strength threshold at block B612, the wireless communication device 200 may conduct IMS voice service through the WLAN connection on the IMS subscription. The wireless communication device 200 may further deactivate the modem stack at the IMS subscription.

If it is determined that the WLAN connection signal strength is not greater than the signal strength threshold at block B612, the wireless communication device 200 may conduct voice service through a circuit-switched cellular network at block B616. The wireless communication device 200 may perform a cell selection or reselection process to identify a circuit-switched cell of 2G/3G RATs (e.g., GSM, WCDMA, 1×, etc.) to camp on and conduct MO/MT call through the circuit-switched cell.

Figure 7:
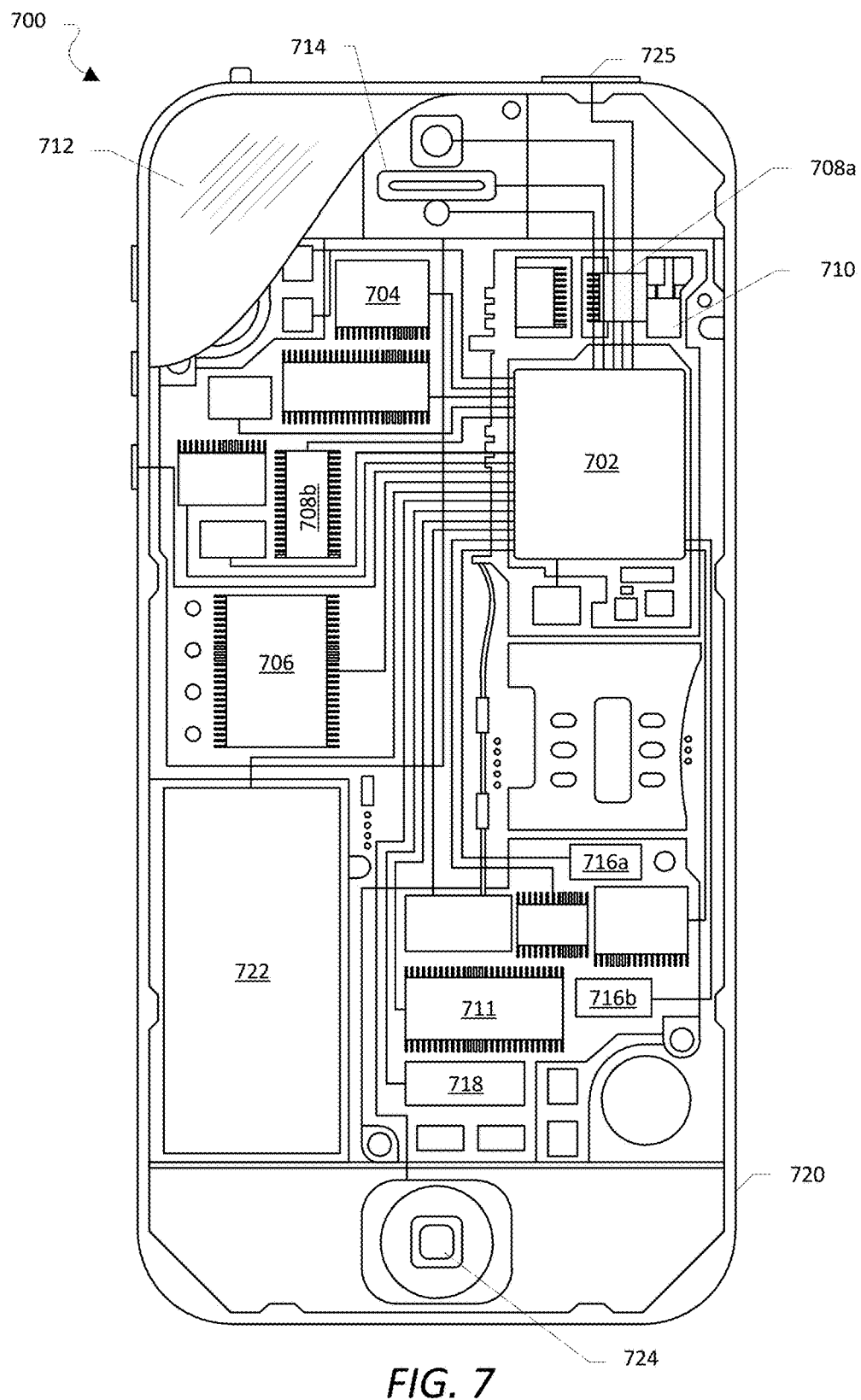
FIG. 7 is a component block diagram of a wireless communication device suitable for use with various examples.

The various examples may be implemented in any of a variety of wireless communication devices 110 and 200, an example of which is illustrated in FIG. 7, as a wireless communication device 700. As such, the wireless communication device 700 may implement the process and/or the apparatus of FIGS. 1-6B, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to at least one antenna 710 and configured for sending and receiving cellular communications. The transceivers 708a, 708b and antenna 710 may be used with the above-mentioned circuitry to implement the various example methods. The cellular network transceivers 708a, 708b may be the RF resource 218. The antenna 710 may be the antenna 220. The wireless communication device 700 may include two or more SIM cards 716a, 716b, corresponding to SIM-1 204a and SIM-2 204b (respectively), coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. For example, the peripheral device connection interface 518 may also be coupled to the WLAN interface 219.

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present invention. Various modifications to these examples will be readily apparent to those skilled in the art, and the generic principles defined herein may be applied to some examples without departing from the spirit or scope of the invention. Thus, the present invention is not intended to be limited to the examples shown herein but is to be accorded the widest scope consistent with the following claims and the principles and novel features disclosed herein.

What is claimed is:

1. A method for a wireless communication device having multiple Subscriber Identity Modules (SIMs) in which a first SIM is associated with an Internet Protocol (IP) Multimedia Subsystem (IMS) subscription used for IMS service, the method comprising:
    attaching the IMS subscription to a first cell of a packet-switched cellular network;
    determining a cause of IMS voice service being not currently available at the IMS subscription, wherein determining the cause of IMS voice service being not currently available comprises determining that Voice over Packet-switched Session (VoPS) is disabled by the first cell;
    barring a Tracking Area Identifier (TAI) associated with the first cell for a period of time;
    determining availability of a wireless local area network (WLAN) connection at the IMS subscription; and
    providing voice service at the IMS subscription based on the cause of IMS voice service being not currently available and the availability of the WLAN connection at the IMS subscription.

2. The method of claim 1, wherein the packet-switched cellular network is a Long Term Evolution (LTE) network.

3. The method of claim 1, wherein determining availability of the WLAN connection comprises determining that the WLAN connection is not available at the IMS subscription, the method further comprising:
    determining whether a second cell of the packet-switched cellular network with a different TAI is available for IMS voice service; and
    in response to determining that the second cell is available, conducting IMS voice service through the second cell at the IMS subscription.

4. The method of claim 3, further comprising: in response to determining that the second cell is not available, conducting voice service through a circuit-switched cellular network.

5. The method of claim 4, wherein the circuit-switched cellular network is a 2G or 3G network using a Radio Access Technology (RAT) of GSM, UMTS, WCDMA, or 1x.

6. The method of claim 1, wherein determining the availability of the WLAN connection comprises determining that the WLAN connection is available at the IMS subscription, the method further comprising:
   determining whether a signal strength of the WLAN connection is greater than a signal strength threshold; and
   in response to determining that the signal strength of the WLAN connection is greater than the signal strength threshold, conducting IMS voice service through the WLAN connection.

7. The method of claim 6, wherein the signal strength threshold is a predetermined value of signal strength.

8. The method of claim 6, further comprising: deactivating modem stack at the IMS subscription.

9. The method of claim 6, further comprising:
   in response to determining that the signal strength of the WLAN connection is not greater than the signal strength threshold, determining whether a second cell of the packet-switched cellular network with a different TAI is available for IMS voice service; and
   in response to determining that the second cell is available, conducting IMS voice service through the second cell at the IMS subscription.

10. The method of claim 9, further comprising: in response to determining that the second cell is not available, conducting voice service through a circuit-switched cellular network.

11. The method of claim 1, wherein the multiple SIMs further comprise a second SIM, the first SIM is designated for voice only services, and the second SIM is designated for data services.

12. A wireless communication device, comprising:
   multiple Subscriber Identity Modules (SIMs) in which a first SIM is associated with an Internet Protocol (IP) Multimedia Subsystem (IMS) subscription used for IMS services;
   a memory;
   a processor coupled to the multiple SIMs and the memory, the processor configured to:
      attach the IMS subscription to a first cell of a packet-switched cellular network;
      determine a cause of IMS voice service being not currently available at the IMS subscription, wherein determining the cause of IMS voice service being not currently available comprises determining that Voice over Packet-switched Session (VoPS) is disabled by the first cell;
      bar a Tracking Area Identifier (TAI) associated with the first cell for a period of time;
      determine availability of a wireless local area network (WLAN) connection at the IMS subscription; and
      provide voice service at the IMS subscription based on the cause of IMS voice service being not currently available and the availability of the WLAN connection at the IMS subscription.

13. The wireless communication device of claim 12, wherein determining the availability of the WLAN connection comprises determining that the WLAN connection is not available at the IMS subscription, the processor further configured to:
   determine whether a second cell of the packet-switched cellular network with a different TAI is available for IMS voice service; and
   in response to determining that the second cell is not available, conduct voice service through a circuit-switched cellular network.

14. The wireless communication device of claim 12, wherein determining the availability of the WLAN connection comprises determining that the WLAN connection is available at the IMS subscription, the processor further configured to:
   determine whether a signal strength of the WLAN connection is greater than a signal strength threshold; and
   in response to determining that the signal strength of the WLAN connection is greater than the signal strength threshold, conduct IMS voice service through the WLAN connection.

15. A method for a wireless communication device having multiple Subscriber Identity Modules (SIMs) in which a first SIM is associated with an Internet Protocol (IP) Multimedia Subsystem (IMS) subscription used for IMS service, the method comprising:
   attaching the IMS subscription to a first cell of a packet-switched cellular network;
   determining a cause of IMS voice service being not currently available at the IMS subscription, wherein determining the cause of IMS voice service being not currently available comprises determining that Service Specific Access Control (SSAC) barring for VoLTE call is enabled at the IMS subscription;
   determining whether a duration of the SSAC barring is greater than a time threshold;
   determining availability of a wireless local area network (WLAN) connection at the IMS subscription; and
   providing voice service at the IMS subscription based on whether the duration of the SSAC barring is greater than the time threshold and the availability of the WLAN connection at the IMS subscription.

16. The method of claim 15, wherein determining the availability of the WLAN connection comprises determining that the WLAN connection is not available at the IMS subscription, the method further comprising:
   in response to determining that the duration of the SSAC barring is not greater than the time threshold, conducting IMS voice service using Circuit-Switch Fall Back (CSFB) through the first cell.

17. The method of claim 15, wherein determining the availability of the WLAN connection comprises determining that the WLAN connection is not available at the IMS subscription, the method further comprising:
   in response to determining that the duration of the SSAC barring is greater than the time threshold, determining whether a second cell of the packet-switched cellular network is available for IMS voice service; and
   in response to determining that the second cell is available, conducting IMS voice service through the second cell at the IMS subscription.

18. The method of claim 17, further comprising returning to the first cell in response to that the duration of the SSAC barring expires.

19. The method of claim 17, further comprising: in response to determining that the second cell is not available, conducting voice service through a circuit-switched cellular network.

20. The method of claim 19, further comprising returning to the first cell in response to that the duration of the SSAC barring expires.

21. The method of claim 15, wherein determining the availability of the WLAN connection comprises determining that the WLAN connection is available at the IMS subscription, the method further comprising:

in response to determining that the duration of the SSAC barring is not greater than the time threshold, staying in the first LTE but conducting IMS voice service through the WLAN connection.

22. The method of claim 15, wherein determining the availability of the WLAN connection comprises determining that the WLAN connection is available at the IMS subscription, the method further comprising:
   in response to determining that the duration of the SSAC barring is greater than the time threshold, determining whether a signal strength of the WLAN connection is greater than a signal strength threshold; and
   in response to determining that the signal strength of the WLAN connection is greater than the signal strength threshold, conducting IMS voice service through the WLAN connection.

23. The method of claim 15, wherein determining the availability of the WLAN connection comprises determining that the WLAN connection is available at the IMS subscription, the method further comprising:
   in response to determining that the duration of the SSAC barring is greater than the time threshold, determining whether a signal strength of the WLAN connection is greater than a signal strength threshold;
   in response to determining that the signal strength of the WLAN connection is not greater than the signal strength threshold, determining whether a second cell of the packet-switched cellular network is available for IMS voice service; and
   in response to determining that the second cell is available, conducting IMS voice service through the second cell at the IMS subscription.

24. The method of claim 23, further comprising: returning to the first cell in response to that the duration of the SSAC barring expires.

25. The method of claim 23, further comprising: in response to determining that the second cell is not available, conducting voice service through a circuit-switched cellular network.

26. The method of claim 25, further comprising: returning to the first cell in response to that the duration of the SSAC barring expires.

* * * * *